July 8, 1969            P. C. WILSON            3,453,703

LONGLINE AUTO-CLIP

Filed Feb. 20, 1968

INVENTOR
PETER C. WILSON

United States Patent Office 3,453,703
Patented July 8, 1969

3,453,703
LONGLINE AUTO-CLIP
Peter C. Wilson, Key Biscayne, Fla., assignor to the United States of America as represented by the Secretary of the Interior
Filed Feb. 20, 1968, Ser. No. 706,935
Int. Cl. A44b 3/02
U.S. Cl. 24—233
9 Claims

ABSTRACT OF THE DISCLOSURE

A clip for the securing of branchlines to longline fishing gear and adapted for mechanical attachment and detachment.

Background of the invention

Longlining is a technique extensively used in commercial fishing for tuna, swordfish and halibut. It may be used for any fish which will strike a baited hook. As practiced, a fishing boat pays out a main or longline to which are attached at spaced intervals branchlines and buoylines. Each branchline carries one or more baited hooks and each buoyline carries a flotation device. In tuna fishing, the longline may have a length of several miles and may carry several hundred branchlines and buoylines.

Early systems for handling longline gear used knots for attachment of branchlines and buoylines to the longline. The advantages of a readily detachable clip to secure these lines to the longline have frequently been emphasized by fishing technologists. Such a system enables hooks to be baited prior to shooting, or paying out the longline, speeds both the shooting and hauling or line retrieval process and decreases the labor required.

A satisfactory clip must be easy to attach and detach, must be free to move around the line but must be unable to slide along the line and must be readily adaptable to mechanical attachment and detachment. A number of clips which fulfill some of these requirements have been developed. These clips generally are formed of heavy wire bent in such a configuration as to allow them to be snapped onto the longline. In use however, these clips often slip along the longline with heavy fish pulls, sometimes unsnap from the longline and deform under the tension of pull from a large fish. Known designs of such clips cannot readily be adapted to a mechanical attaching and detaching operation.

The present invention comprises a longline clip adaptable to either manual or automatic attachment and detachment of branchlines and buoylines.

It is an object of this invention to provide an improved clip.

A further object of this invention is to provide a clip which is readily adaptable to mechanical indexing and orientation, which can be simply fabricated by conventional techniques and which is useful in attaching branchlines and buoylines to longline fishing gear.

Description of the invention

This invention will be more clearly understood from the following description of a preferred embodiment wherein reference is made to the accompanying drawings.

Figure 2:
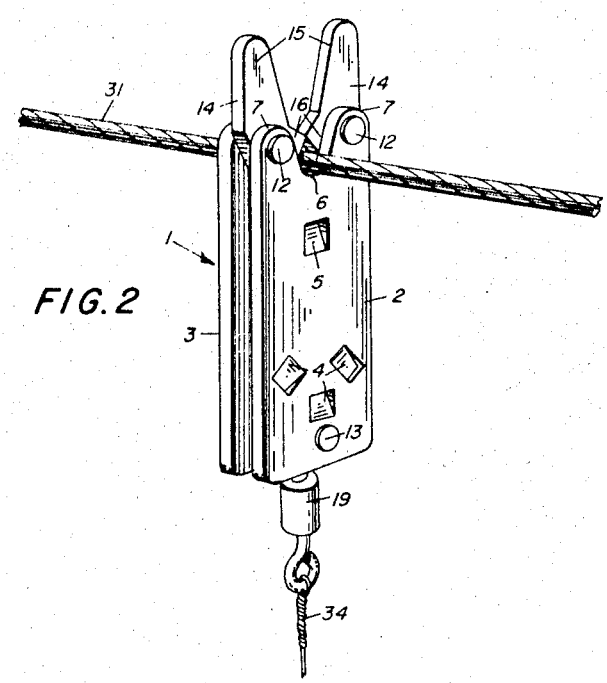
FIGURE 2 is a perspective view of the longline clip.
Figure 3:
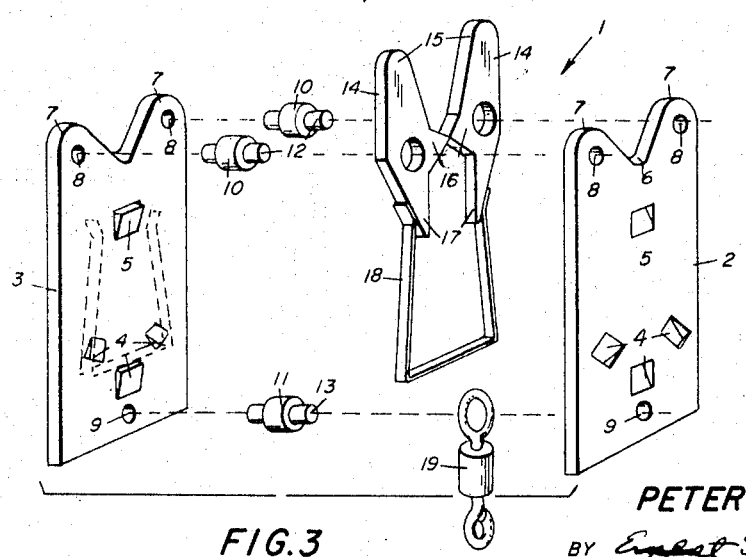
FIGURE 3 is an exploded view of the clip showing construction details.

Referring now to FIGURES 2 and 3 more particularly by reference numerals, 1 indicates generally a preferred embodiment of the longline clip. The clip comprises an upper and a lower body plate, 2 and 3 respectively. These body plates are preferably identical and are assembled in a mirror image relationship. They are conveniently formed by die stamping from relatively thin sheet metal. Corrosion resistant alloy strapping is preferred as the body plate material. Alternatively, the body plates may be formed from a high strength thermoplastic such as high density polyethylene, polypropylene and the like by conventional techniques such as injection molding.

Three spring guide projections 4 and a jaw stop projection 5 extend inwardly from each body plate. These projections are preferably formed during the die stamping or molding operation. Centered in the front end of each body plate is a slot or throat 6 which tapers backwardly and terminates in a radius of curvature equal to, or very slightly smaller than, the radius of the longline. On either side of throat 6 are ears 7, each ear having a hole 8 which is preferably centered in and located near the extremity of each ear. Centered in and located near the opposite or back end of each body plate is a third hole 9.

The two body plates are held in a spaced-apart relationship by front bushings 10 and rear bushing 11 which are mounted on rivets 12 and 13 respectively. Rivets 12 and 13 are fitted into holes 8 and 9 and are clinched to hold the clip in an assembled position. Bushings 10 and 11 are preferably formed of a plastic having a relatively high strength and a low coefficient of friction. Example of suitable materials are nylon and formamldehyde resins such as Delrin.

Pivotally mounted on bushings 10 between body plates 2 and 3 are jaws 14. The jaws are preferably of identical configuration and are assembled in a mirror image relationship. Jaws 14 comprise a rounded lip portion 15 which extends outwardly beyond the body plates. Jaw teeth 16, in closed position, extend across body plate throat 6, terminate in jaw points 17 and in cooperation with throat 6 form an enclosure within which is secured the longline 31. Pivotal movement of the jaws is limited by contact of jaw points 17 with jaw stop 5.

The jaws are held in a normally closed position by pressure exerted by the ends of spring 18. Force exerted by a rope or line 31 within the enclosure formed by the jaw teeth and throat tends to act with the spring pressure and press the jaws more tightly closed. Spring 18 preferably comprises a flat strip of corrosion resistant material, such as 304 stainless steel, which is bent so as to be held in position by spring guide projections 4. The ends of spring 18 are preferably curved to provide a sliding contact with the outside edge of jaw points 17. Swivel 19 is held in place at the back end of the clip and pivots freely around bushing 11 and rivet 13. The clip is preferably finished in a flat black color, as by hardcoat anodizing, in order to reduce its attractiveness to fish and prevent mainline damage caused by fish striking the clip.

Figure 1:
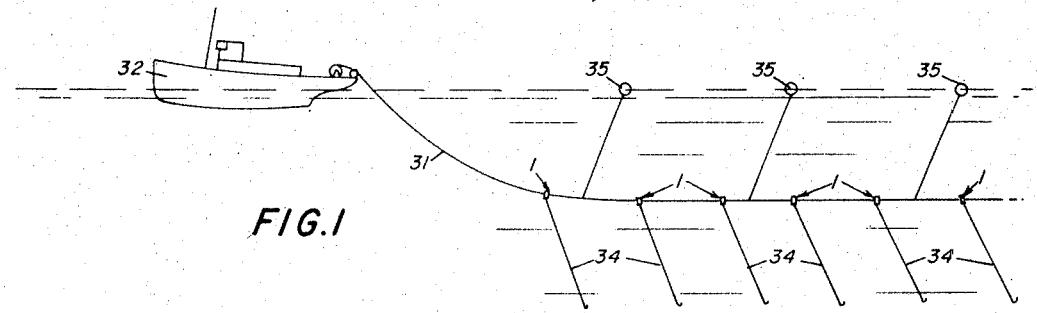
FIGURE 1 is a representation of the use of the clip in longline fishing.

Referring now to FIGURE 1, there is shown a representation of the clip as used in longline fishing.

As shown in the drawing, longline 31 is trailed from vessel 32. Attached to the longline at spaced intervals by means of clips 1 are baited branchlines 34. Buoylines 35, also connected to the longline with clips 1, are attached at intervals of several branchlines. The buoylines are connected to buoys 35 on the sea surface and act to suspend the fishing gear at a fixed level below the sea surface. Buoylines and branchlines are connected to the clips through a barrel-type swivel to provide for rotation of the line.

During set out of the fishing gear, the longline is payed out behind the moving vessel. Baited branchlines, each secured to a clip, are attached to the longline by pushing the clip, either mechanically or manually, onto the moving longline. As the longline is inserted between the jaws of the clip, the jaw teeth are forced apart against spring tension thus allowing the longline to slip past the jaw teeth and into the throat of the clip. Once the longline is in the throat of the clip, the jaw teeth snap shut under pressure of the spring. Due to the manner in which the jaws are pivoted between the body plates of the clip, pressure of the longline against the jaw teeth serves to aid the spring action. This results in an increase in the gripping force of the jaws on the longline effectively preventing longline escape and lateral movement of the branchline.

When longline gear is retrieved, the clip-attached branchlines and buoylines approach from various angles and under varying tensions depending on the catch, weather, sea and vessel maneuvering. Regardless of the approach angle or tension, clip-attached branchlines and buoylines may be readily released from the longline either mechanically or manually. If the operation is mechanical, the longline is directed through a fairlead sheave designed to orient, detach and catch the clips with their attached lines. If the detaching operation is manual, or if the branchline is snarled about the longline precluding mechanical detachment, the clip is removed by grasping it with one hand and closing the protruding jaw lips.

As may readily be appreciated from the description of the invention, use of the longline clip provides a reduction and possible elimination of manual handling of longline gear. The result is to improve safety aboard vessels, lower labor costs and to increase speed and efficiency of the fishing operation.

What is claimed is:

1. A clip device for attachment to a line which comprises in combination a pair of body plates held in a parallel spaced relationship, each of said body plates having at one end thereof a slot-like throat defining two ear members, a pair of jaw means pivotally mounted between said body plates and having means for frictionally gripping a line to prevent sliding of the clip along the line, each of said jaw means comprising a lip member extending outwardly beyond said body plates, a jaw point member extending inwardly between said body plates and a jaw tooth member intermediate said lip member and point member, spring means acting upon said jaw means to hold said jaw tooth members in a normally closed mating position, said throat and jaw tooth members cooperating to form an enclosure when said jaw tooth members are in normally closed mating position and said jaw point members being engageable in a gripping relationship with a line to be positioned within said enclosure, said clip device being dimensioned so that increased tension on the clip increases the gripping force of the jaw points on a line so positioned within the enclosure.

2. The device of claim 1 wherein said body plates include an inwardly directed jaw stop projection which acts upon said jaw points to limit pivotal movement of said jaw members.

3. The device of claim 2 wherein said spring means comprise a single flat strip secured between said body plates, each end of said strip being in sliding contact with the outside edge of said jaw points.

4. The device of claim 3 wherein said spring means is secured between said body plates by a plurality of inwardly directed spring guide projections.

5. The device of claim 4 wherein said body plates are of identical configuration and are assembled in a mirror image relationship.

6. The device of claim 5 wherein said jaw means are of identical configuration and are assembled in a mirror image relationship.

7. The device of claim 6 wherein said jaw members are pivotally mounted on bushings, said bushings acting to hold said body plates in a spaced relationship.

8. The device of claim 7 wherein said bushings comprise a plastic having a relatively high strength and low coefficient of friction.

9. The device of claim 8 including a swivel pivotally mounted between said body plates at the end of said plates opposite said throat.

References Cited

UNITED STATES PATENTS

| 578,248 | 3/1897 | Layne | 43—27.4 |
|---|---|---|---|
| 2,466,939 | 4/1949 | Fowler | 43—44.85 XR |
| 2,784,475 | 3/1957 | Schmitt | 24—233 XR |
| 2,889,095 | 6/1959 | Heidecke et al. | 24—233 XR |

DONALD A. GRIFFIN, *Primary Examiner.*

U.S. Cl. X.R.

43—44.85